United States Patent [19]
Polley et al.

[11] Patent Number: 5,823,004
[45] Date of Patent: Oct. 20, 1998

[54] OUTDOOR FAN CONTROL FOR PART LOAD EFFICIENCY

[75] Inventors: Phillip L. Polley, Clarksville; William G. Hansen, Adams, both of Tenn.

[73] Assignee: American Standard Inc., Piscataway, N.J.

[21] Appl. No.: 747,178

[22] Filed: Nov. 12, 1996

[51] Int. Cl.$^6$ .................................................. F25B 39/00
[52] U.S. Cl. ................... 62/179; 62/180; 62/181
[58] Field of Search .................. 62/180, 179, 181, 62/183, 184, 186, 228.3, 229

[56] References Cited

U.S. PATENT DOCUMENTS

| | | | |
|---|---|---|---|
| 4,364,237 | 12/1982 | Cooper et al. | 62/181 X |
| 4,705,457 | 11/1987 | Belusa | 417/22 |
| 4,870,833 | 10/1989 | Matsuda et al. | 62/180 X |
| 5,046,549 | 9/1991 | Isono | 165/39 |
| 5,062,276 | 11/1991 | Dudley | 62/180 X |
| 5,193,355 | 3/1993 | Matsumi | 62/262 |
| 5,221,185 | 6/1993 | Pla et al. | 416/34 |
| 5,253,483 | 10/1993 | Powell et al. | 61/181 |
| 5,385,030 | 1/1995 | Kitagawa et al. | 62/160 |
| 5,533,348 | 7/1996 | Baldwin et al. | 62/129 |
| 5,572,876 | 11/1996 | Um | 62/179 X |

*Primary Examiner*—Harry B. Tanner
*Attorney, Agent, or Firm*—William J. Beres; William O'Driscoll; Peter D. Ferguson

[57] ABSTRACT

A method of controlling fans in a rooftop air conditioning unit. The method comprises the steps of: determining a measure of compressor operating capacity; calculating an indoor fan speed as a function of that capacity; maintaining a fixed relationship between the indoor fan speed and an outdoor fan speed; and controlling the indoor fan in accordance with the calculated indoor fan speed.

8 Claims, 1 Drawing Sheet

OUTDOOR FAN CONTROL FOR PART LOAD EFFICIENCY

BACKGROUND OF THE INVENTION

The present invention is directed to fan control for a rooftop air conditioning unit.

Previous rooftop air conditioning units took a number of approaches to controlling fans over a range of conditions. One approach staged multiple single speed fans to cover the desired operating range. This is less efficient than a single variable speed fan due to non-optimum airflow steps and due to the bypass of air through a de-energized fan. In another approach separate individual variable speed drives were used. This achieved comparable efficiency to the present invention but at a much higher cost. A third approach used two speed outdoor fan motors. This is less efficient than a single variable speed fan due to the non-optimum airflow steps.

SUMMARY OF THE INVENTION

It is an object, feature and advantage of the present invention to solve the problems of the prior art fans.

It is an object, feature and advantage of the present invention to increase fan efficiencies and to optimize airflow and thereby to improve part load efficiencies in the fan control of a rooftop air conditioning unit.

It is an object, feature and advantage of the present invention to eliminate the need for a separate controller for the outdoor fan in a rooftop air conditioning unit.

It is an object, feature and advantage of the present invention to improve reliability by operating outdoor fans at reduced speeds.

It is an object, feature and advantage of the present invention to reduce noise levels when compared to stepped fans.

It is an object, feature and advantage of the present invention to provide proportional indoor airflow as required for cooling where the outdoor airflow follows the indoor airflow.

It is an object, feature and advantage of the present invention to control both indoor and outdoor fan speeds with a common control signal.

The present invention provides a method of controlling fans in a rooftop air conditioning unit. The method comprises the steps of: determining a measure of compressor operating capacity; calculating an indoor fan speed as a function of that capacity; maintaining a fixed relationship between the indoor fan speed and an outdoor fan speed; and controlling the indoor fan in accordance with the calculated indoor fan speed.

The present invention also provides a method of controlling variable speed fans in an air conditioning system. The method comprises the steps of: determining compressor operating capacity; controlling the speed of an indoor fan as a function of the compressor operating capacity; and controlling the speed of an outdoor fan as a function of the compressor operating capacity or the indoor fan speed.

The present invention further provides a fan control system. The system comprises: a variable speed drive, an indoor fan assembly operatively connected to the variable speed drive, an outdoor fan assembly operatively connected to the variable speed drive, and a controller. The controller is operatively connected to the variable speed drive, and determines and provides a single control signal for both the indoor fan speed and the outdoor fan speed.

DETAILED DESCRIPTION OF THE DRAWINGS

Figure 1:
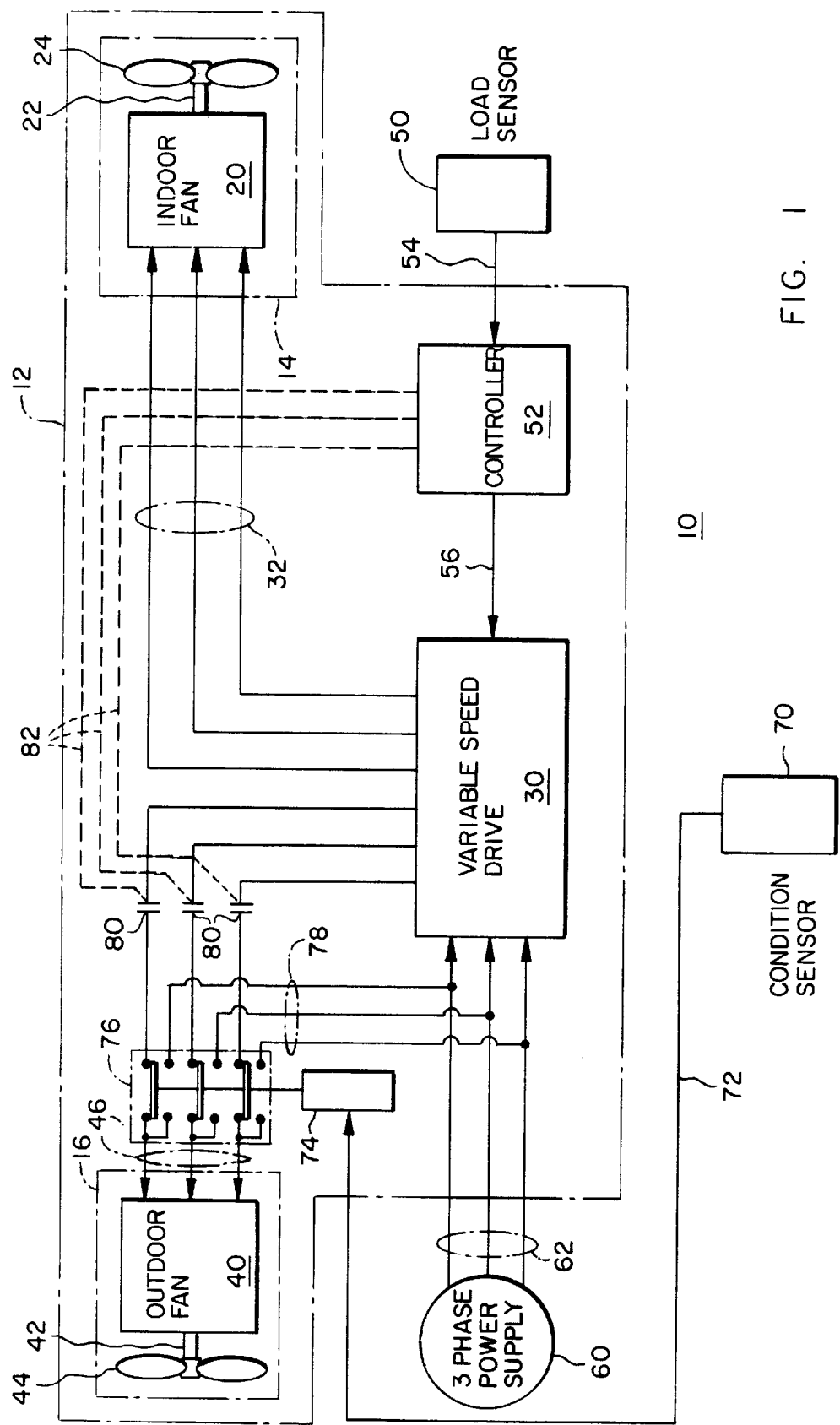
FIG. 1 is a block diagram of a first embodiment of the invention.

In FIG. 1, an air conditioning system 10 is shown in accordance with the present invention. The air conditioning system 10 is preferably a single housing rooftop air conditioning unit 12 such as commonly assigned U.S. Pat. No. 5,533,348 to Baldwin et al. incorporated by reference herein, but also applies to other built up, split system and packaged air conditioning systems. In connection with the air conditioning system 10 it should also be recognized that the system as installed will contain the conventional components for a heating, ventilating and air conditioning system including a compressor, condenser, evaporator, heating and reheat coils with an expansion valve and heat pump circuitry in accordance with the application of the system and in accordance with the system designer. Additionally, although the term air conditioning is used when referring to the system 10, it should be recognized that the present invention is directed to the controlling of the fans as opposed to conditioning of the air.

Within the housing 12 of the air conditioning system 10 are located an indoor fan assembly 14 and an outdoor fan assembly 16. The indoor fan assembly 14 includes a fan motor 20 which drives a shaft 22 on which a fan 24 is mounted. The indoor fan motor 20 is preferably a variable speed motor whose speed and power is controlled by a variable speed drive 30 by means of an electrical connection 32 between the variable speed drive 30 and the indoor fan 20. The outdoor fan assembly 16 includes a motor 40 which motivates a shaft 42 to which a fan 44 is connected to and rotated by. The outdoor fan motor 40 is preferably a variable speed motor which is connected to the variable speed drive 30 by an electrical connection 46. The indoor fan assembly 14 is preferably designed to have fifty percent greater capacity than the outdoor fan assembly 16.

It is the essence of the present invention that the outdoor fan assembly 16 and the indoor fan assembly 14 share a common variable speed drive 30, and that a single drive signal is calculated for and used to control both the indoor fan assembly and the outdoor fan assembly 16. The variable speed motors 20, 40 are preferably always running at the same frequency.

To accomplish this purpose, a load sensor 50 provides a measure of compressor operating capacity to a microprocessor based controller 52 by means of an electrical connection 54. Such a load sensor 50 measures an indicia of compressor operating capacity such as setpoint error in a zone, refrigerant flow rate, pressure differential, temperature differential or the like, individually or in combination. Preferably, the load sensor 50 is a wall thermostat staging a compressor based on sensible load in a zone to be air conditioned. From the measure of compressor operating capacity, the controller 52 calculates a compressor operating capacity and determines an indoor fan speed based on that compressor operating capacity. The indoor fan speed is transmitted to the variable speed drive 30 by means of a connection 56. The variable speed drive 30 uses the signal to directly control the indoor and outdoor fan speeds to minimize indoor and outdoor fan power while maintaining optimum system operating pressures and maximizing part load efficiencies. The variable speed drive 30 receives power from a power supply 60 by means of an electrical connection 62. The power supply 60 is preferably three-phase.

In general, the outdoor fan speed is directly proportional to the indoor fan speed, varying in a linear manner, preferably where the indoor and outdoor fan speeds are controlled at the same frequency. Since the indoor and outdoor fan capacities are preferably at different capacities, the airflow will vary between the outdoor fan and the indoor fan even though they operate at the same speed.

The present invention also includes an ambient condition sensor 70 which provides a signal on an electrical line 72 whenever the condition sensor 70 detects extreme ambient conditions. The signal on the line 72 actuates an actuator 74 such as a solenoid which controls a set of interlocked contactors 76 in the drive circuit. The set of interlocked contactors 76 decouples the outdoor fan assembly 16 from the variable speed drive 30 under extreme ambient conditions and directly couples the outdoor fan assembly 16 to the power supply 60 by means of a set of electrical lines 78. This results in the outdoor fan assembly 16 being shifted to full speed operation when required by extreme ambient conditions.

Contactors 80, operatively connected to the controller 52 by an electrical connection 82, may be provided to turn off or disconnect the outdoor fan 40 when ventilating or gas fired heating modes of operation are operational.

The present invention has been described in terms of fan control for a rooftop air conditioning unit. Essentially, the variable speed indoor and outdoor fans are controlled by a single variable speed drive based on compressor operating capacity. Clearly, a person of ordinary skill in the art will recognize that many modifications or alterations could be made to this invention. Different air conditioning systems could be used, different circuitry could be used to accomplish the purpose, and many of the wired connections could be eliminated in favor of wireless, fiber optic or infrared transmissions. Additionally, the variable speed drive could be modified to directly control the speed of one fan, such as the indoor fan, and the same control signal could be proportionately adjusted to control the speed of the other fan, such as the outdoor fan. For example, the separate electrical connections 46, 32 controlling the outdoor fan assembly 16 and the indoor fan assembly 14 can be eliminated in favor of a single electrical connection, and a proportionator added between the single electrical connection and the outdoor for assembly 16 to automatically adjust or offset the signal to control the outdoor airflow. In another modification to the present invention, the outdoor fan speed may be calculated as a function of compressor operating capacity, and the indoor fan speed may be calculated or determined as a function of the outdoor fan speed. All such modifications and alterations are contemplated to fall within the spirit and scope of the present invention as claimed.

What is desired to be secured for Letters Patent of the United States is set forth in the claims as follows.

We claim:

1. A method of controlling fans in a rooftop air conditioning unit comprising the steps of:
    determining a measure of compressor operating capacity;
    calculating an indoor fan speed as a function of that capacity;
    maintaining a fixed relationship between the indoor fan speed and an outdoor fan speed;
    controlling the indoor fan in accordance with the calculated indoor fan speed;
    monitoring ambient conditions;
    determining if those monitored conditions are extreme; and
    overriding the outdoor fan control to couple the outdoor fan directly to the power supply if the monitored conditions are extreme.

2. The method of claim 1 including the step of:
    providing differing indoor and outdoor fan capacities.

3. The method of claim 1 including the further step of:
    varying the outdoor fan speed in direct proportion to the indoor fan speed.

4. The method of claim 1 including the further step of:
    controlling the indoor fan speed and the outdoor fan speed using a single drive.

5. A method of controlling variable speed fans in an air conditioning system comprising the steps of:
    determining compressor operating capacity;
    controlling the speed of an indoor fan as a function of the compressor operating capacity;
    controlling the speed of an outdoor fan as a function of the indoor fan speed;
    monitoring ambient conditions;
    determining if those monitored conditions are extreme; and
    overriding the outdoor fan control to couple the outdoor fan directly to the power supply if the monitored conditions are extreme.

6. The method of claim 5 including the further step of:
    controlling the speeds of the indoor and outdoor fans using a common control signal.

7. The method of claim 6 wherein the outdoor fan speed is a function of or dependent on the indoor fan speed.

8. A fan control system comprising:
    a variable speed drive;
    an indoor fan assembly operatively connected to the variable speed drive;
    an outdoor fan assembly operatively connected to the variable speed drive;
    a controller, operatively connected to the variable speed drive, for determining and providing a single control signal for both the indoor fan speed and the outdoor fan speed;
    a thermostat responsive to a sensed condition, the thermostat being operatively connected to the controller and providing the sensed condition to the controller and the controller using the sensed condition to determine the single control signal;
    a power supply providing power to the variable speed drive;
    an electrical connection between the variable speed drive and the indoor fan assembly and operative to provide power from the variable speed drive to the indoor fan assembly;
    a second set of wiring between the outdoor fan assembly and the variable speed drive and operative to provide power to the outdoor fan assembly;
    an ambient temperature sensor sensing ambient temperature and providing a signal whenever the sensor detects extreme ambient conditions; and
    a decoupler operatively connected to the ambient temperature sensor and receiving the signal representative of extreme ambient conditions, the decoupler breaking the connection between the outdoor fan assembly and the variable speed drive and having wiring and coupling the outdoor fan assembly by the wiring directly to the power supply when the extreme ambient conditions are detected.

* * * * *